S. GARDINER, Jr.
Improvement in Electro-Magnetic Meters.
No. 132,569.             Patented Oct. 29, 1872.
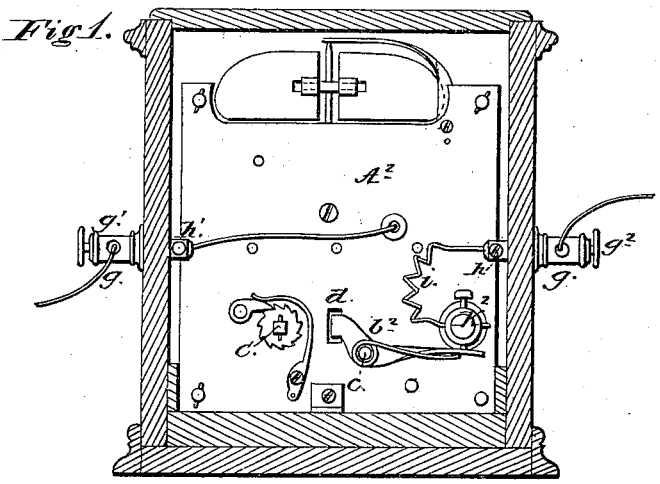
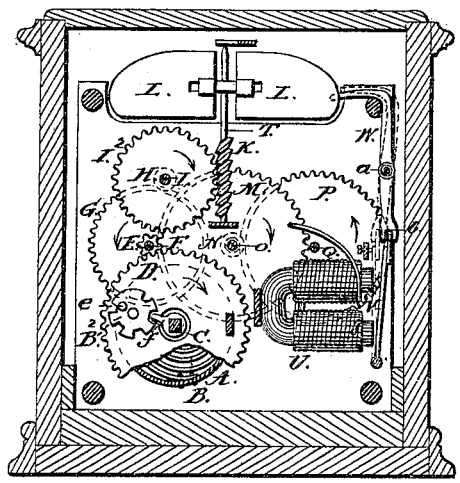
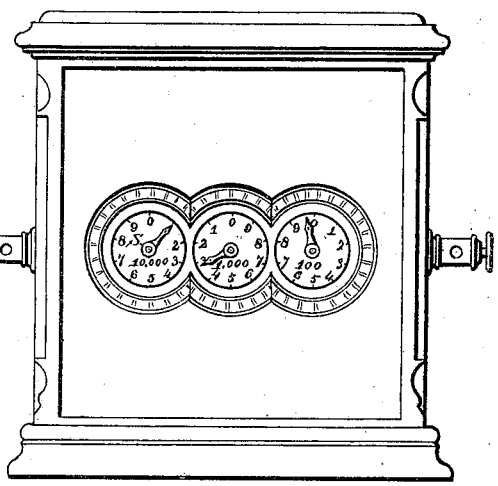
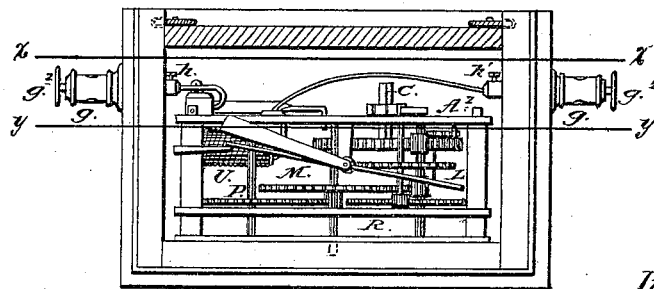
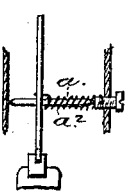
Witnesses.             Inventor.

UNITED STATES PATENT OFFICE.

SAMUEL GARDINER, JR., OF NEW YORK, N. Y.

IMPROVEMENT IN ELECTRO-MAGNETIC METERS.

Specification forming part of Letters Patent No. 132,569, dated October 29, 1872.

*To all whom it may concern:*

Be it known that I, SAMUEL GARDINER, Jr., of the city, county, and State of New York, have invented certain Improvements in Electro-Magnetic Meters, of which the following is a specification:

My invention relates to a device for registering the amount of electricity used or consumed in dwellings or places of business, the principal object of which is to afford a ready electro-magnetic meter, to be used in connection with a general local battery where it is important to be able to fix upon a price to charge persons having the benefit of electricity served from said general local battery. It consists of a system of cog-wheels driven by a weight or spring, the same being so arranged with relation to each other as that when in operation they record on the faces of several dials approximately the amount of electricity used.

Description of Drawing.

Figure 1 is a rear elevation of meter with the back of case removed; Fig. 2, section on line $y\ y$, (see Fig. 4,) showing the clock mechanism. Fig. 3 is a front elevation of box, showing the dial-plates; Fig. 4, plan with top of case removed. Fig. 5 is the arbor and engaging-spring of the detent-lever W.

General Description.

Similar letters of reference refer to corresponding parts in all the figures.

A is the drum which incloses the strap spiral spring B, which gives force to power to drive the various wheels of the device. C is the arbor or shaft, to which one end of the spring B is attached and about which said spring is coiled. The other end of spring B is fastened to the drum A. The arbor C, at its outside end, is fashioned square to receive a key, which winds the spring like that of any ordinary clock. To the head of the drum A is secured a spur-wheel, D, of a given size, which gears with a pinion, E, on a shaft supported in journal-bearings formed in the front and back plates of the meter. About the axis of the shaft F, on which is secured the pinion E, is a spur-wheel, G, which engages another pinion, H, on the shaft I. About the shaft I is a spur-wheel, $I^2$, which gears with the screw K and drives the regulating fan or fly L. On the shaft E is another pinion, which engages the wheel M and moves the pinion N on the shaft O with it, which in turn moves the wheel P. on the shaft Q. The shafts F, O, and Q are extended through the front plate R of the device and the dial-plate S, and have secured to them hands or pointers, which move over said dial and indicate the number of degrees or amount of electricity used. The fly L, which revolves about the axis of the shaft on which is the screw-pinion K, is made in two separate blades, secured together with screws so as to be capable of adjustment to regulate a greater or less amount of speed. To facilitate this adjustment a small dial might be attached to the collar which encircles the shaft T, and divided into equal parts radially, so that an accurate adjustment might be made to regulate the record of the hands on the dial-plate. Within the case of the meter I secure firmly to the main plates an electro-magnet, U, having the axes of the poles running to connect with the general local battery and the gas-jets, or wherever the electricity is to be applied. An armature, V, is pivoted to the plates of the meter. The hooked lever W, which has its fulcrum at $a$, has a slot, $b$, at its lower end, which receives the loose end of the armature V and holds it away from the electro-magnet when the current of electricity is incomplete. About the axle $a$, which forms the fulcrum to the lever-pawl, is coiled a spiral spring, $a^2$, which throws the hook-end of said lever against one of the blades of the fly and prevents the spring B from acting on the clock-work, and, as previously explained, the slotted arm of said lever keeps the armature from the magnet. The lever $b^2$, as seen in Fig. 1, has its fulcrum at $c$, and the end of its long arm bearing against a platinum point on the insulated screw-spindle $k^2$ attached to the back plate $A^2$. This lever has its short arm bent in order that it may enter the slot $a$ and offer a resistance to a small pin, $e$, on the stop-wheel $B^2$. The stop-wheel $B^2$ is attached loosely to the spur-wheel D. Its teeth are engaged by the single tooth $f$, attached to the arbor C, as the same is turned about its axis by the key which winds the meter. The wheel B has as many spaces as the arbor C makes revolutions when wound, and one blank, which prevents overwinding, like the stop device in an ordinary watch. When the meter is recording, the spaces in the wheel B² are met by the single tooth $f$, and consequently said wheel performs nearly a revolution before the spring B is uncoiled. The pin $e$ is adjusted in the wheel B so that just before the clock-work runs down said pin will arrive at a point within reach of the short arm of the lever $b^2$, and serves the purpose of a cam to lift said arm and sever the connection between the lever and screw-spindle. The wire which connects with the local battery is attached to the metallic spindle $g$, which passes through the wooden case of the meter and is clamped by a clamp-screw, $g^2$. Another clamp-screw, $h$, secures the wire $i$ to the insulated spindle $k^2$. The lever $b$ has a spring coiled about its fulcrum $c$, attached to plate $A^2$, which bears against the end of the said lever and returns it. The wire of the lower helix of the electro-magnet is attached to the plate $A^2$ against the insulated spindle $k^2$, which completes the metallic or conducting connection between the electro-magnet and the main battery. From the other helix the wire passes through an insulator in the plate $A^2$ and connects with the gas-jet or the point where the electricity is to be used, through the fixture $h'$ $g^1$, like that on the opposite side of the box.

The current which comes from the main battery, when switched on, passes to the electro-magnet U, and causes the armature to approach and move the hook-lever W, which releases the fly and allows the clock-work to register approximately the amount of electricity which passes from the main battery by way of the magnet to the point where the same is used. When the mainspring B is uncoiled the pin $e$ in the wheel $B^2$, being at the proper place, lifts the lever $b^2$ and severs the electric connection, which prevents any further use of the electricity coming from the main battery until the registering device is rewound. It is quite impossible for a person to have the use of the electricity unless the registering device is kept wound up, and at the same time, when the registering device is wound up, the amount of electricity is sure to be registered upon the dial-plates arranged for the purpose.

My device for measuring electricity is applicable to telegraphing as well as where a more continuous current is used, as by changing the angle of the fans or flies a greater or less speed is attained. The dials are arranged with figures, from 1 to 10. The one on the right will register as many hundreds, the middle one as many thousands, and that on the left as many tens of thousands as there are spaces in each between their respective figures.

Claims.

What I claim is—

1. The combination and arrangement of an electro-magnet and its armature with the releasing device of a clock mechanism for indicating upon a dial the time during which an electrical current is in action.

2. The lever $b^2$ or its equivalent, in combination with the conducting-connection $k^2$ and pin $e$ on the stop-wheel $B^2$ for breaking the electrical connection, as and for the purpose set forth.

SAML. GARDINER, JR.

Witnesses:
 EDW. W. DONN,
 L. J. BELT.